United States Patent
Shi et al.

(10) Patent No.: US 7,692,558 B2
(45) Date of Patent: Apr. 6, 2010

(54) APPARATUS, AND AN ASSOCIATED METHOD, FOR FORMING A TRAFFIC ROUTE VISUALIZATION

(75) Inventors: Yuhui Shi, Carmel, IN (US); Kas Kasravi, W. Bloomfield, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 337 days.

(21) Appl. No.: 11/832,224

(22) Filed: Aug. 1, 2007

(65) Prior Publication Data

US 2009/0033519 A1    Feb. 5, 2009

(51) Int. Cl.
*G08G 1/123* (2006.01)

(52) U.S. Cl. .............................. 340/995.13; 340/995.1; 340/995.17; 340/995.19

(58) Field of Classification Search ............... 340/995.1, 340/995.13, 995.17, 995.19, 995.25, 995.12
See application file for complete search history.

(56) References Cited

U.S. PATENT DOCUMENTS

| | | | | |
|---|---|---|---|---|
| 6,070,123 | A * | 5/2000 | Beyer et al. | 701/209 |
| 6,199,009 | B1 * | 3/2001 | Meis et al. | 701/202 |
| 7,539,572 | B2 * | 5/2009 | Kamikawa et al. | 701/207 |
| 2006/0164412 | A1 | 7/2006 | Dupont et al. | |
| 2007/0150188 | A1 * | 6/2007 | Rosenberg | 701/211 |

* cited by examiner

*Primary Examiner*—Travis R Hunnings

(57) ABSTRACT

Apparatus, and an associated method, for providing traffic route visualization. An electronic map device creates a map that is displayable at a user display of a user interface. The map is created through the access of a traffic image data base and a traffic information data base. Information stored at the data bases is obtained in a collaborative effort to provide and maintain updated information thereat. Images stored at the image data base comprise actual image files or photo realistic images that are consolidated together with traffic information. The resultant map is of characteristics permitting quick comprehension by a viewer thereof.

18 Claims, 3 Drawing Sheets

APPARATUS, AND AN ASSOCIATED METHOD, FOR FORMING A TRAFFIC ROUTE VISUALIZATION

The present invention relates generally to a manner by which to create and display a visualization of a traffic route. More particularly, the present invention relates to apparatus, and an associated method, by which to provide a traffic route visualization formed of actual, or photorealistic, images of the traffic route together with current traffic information along the traffic route.

An improved display is provided to a user that shows an informative representation of actual traffic conditions along the traffic route in a manner that facilitates quick comprehension by a viewer of the display. The traffic route visualization is, e.g., a visualization of a roadway, railroad route, ship route, air route, or any other routing, or combination thereof, for which a visualization would benefit a user.

BACKGROUND OF THE INVENTION

Cartographic techniques have long been utilized to create maps that identify and represent geographical indicia. Travel planning, of course, benefits greatly when maps associated with the anticipated travel are available.

While maps have long been printed on paper, or analogous materials, advancements in technologies have permitted the development of maps that are displayable in additional manners. For instance, through the use of processing circuitry and readily-available, portable display devices, maps of any of many geographical locations are creatable and displayable upon the display device. In some of such electronic map devices, the map is created by retrieving map indicia from a storage element and using the map indicia in the creation of the map display. Storage elements of large storage sizes permit large amounts of map indicia to be stored and to permit the creation of large numbers of different maps. The need otherwise to make available a corresponding number of much bulkier paper, or analogous, maps is obviated.

Electronic map devices are sometimes combined with GPS (Global Positioning System) receivers, or are otherwise provided with positioning information. The positioning information permits the automatic generation of a map at the map device. And, a viewer is able to view a display of the map at a display element of the map device. Thereby, a map display, including a current location at which the electronic map device is positioned is readily available for viewing by a viewer.

To date, however, the displays that are displayed upon an electronic map device are generally of characteristics that are quite similar to paper, or analogous, maps. That is to say, even when presented in electronic form, maps created by electronic map devices are generally presented as a series of two-dimensional images, e.g., roadways are typically identified by, parallel black lines against a background, such as a yellow background. Such representations sometimes require a viewer to exert substantial concentration fully to comprehend the map display. The viewer must mentally convert the two-dimensional images of the map display to actual streets, buildings, bridges, or other physical objects. When the viewer is also operating a motor vehicle, the resulting distraction of the viewer's attention from operation of the motor vehicle might result in a potentially dangerous condition.

While the use of electronic map devices provide many informational and convenient advantages, the displays that are conventionally provided are far from ideal.

Accordingly, if an improved manner could be provided by which to visualize a traffic route, or other map display, the advantages of an electronic map device would be more fully realized.

It is in light of this background information related to cartographic techniques and devices that the significant improvements of the present invention have evolved.

SUMMARY OF THE INVENTION

The present invention, accordingly, advantageously provides apparatus, and an associated method, for creating and displaying a visualization of a traffic route.

Through operation of an embodiment of the present invention, a manner is provided for visualizing an actual, or photorealistic image of the traffic route together with current traffic information along the traffic route.

In one aspect of the invention, an improved display is provided to a user in which the display shows an informative representation of actual conditions along the traffic route. Use of actual, or photorealistic images together with the traffic information permits traffic route visualization that facilitates quick comprehension by a viewer of the display.

In another aspect of the present invention, a database is provided at which video files, or photorealistic images are collected and stored. The contents of the data base are accessible to, or form part of, an electronic map device. The files that are collected and maintained at the database are, in one implementation, created through the capture of video images and storage at the data base of the captured images. In another implementation, the files are created through the use of virtual reality or computer-aided design tools. And, the images are augmented by locational and orientational parameters. And, in one implementation, the video images are captured by multiple parties that provide such captured images to the data base for storage thereat and subsequent retrieval. That is to say, the contents of the data base are created by a collaborative knowledge effort with contributions from a large number of providers.

In another aspect of the present invention, a traffic information data base is provided at which traffic information is collected and maintained. The traffic information data base forms part of, or is otherwise accessible to, the electronic map device. In one implementation, the data that is collected and stored at the traffic information data base is regularly updated, in some instances, at frequent, e.g., minute-by-minute, intervals. Traffic information is, for instance, provided by multiple information providers, i.e. sources, such as individuals, official authorities, deemed-reliable sources, etc. Again, in one implementation, a collaborative collection procedure is utilized with information contributions from many sources in a dynamic manner.

In another aspect of the present invention, an information-quality prioritization scheme is utilized. In the event of conflicting traffic information, a conflict resolution scheme is utilized by which to resolve the conflict. The conflict is resolved by prioritizing the information. The prioritization is, for instance, based upon the source of the information or, e.g., its timeliness, or a combination thereof. In a further implementation, the priorities associated with the information are managed heuristically, such as through use of an inference engine.

In another aspect of the present invention, GPS, or other, positioning information is provided to the electronic map device. In one implementation, the map device includes a GPS receiver as a portion thereof. The GPS information provides positional coordinates of the map device or an offset therefrom. The positional coordinates are utilized by the map device in the creation of an image and in the formation of traffic indications. The positional coordinates are used, e.g., to access files stored at the traffic image database. And, e.g., the positional coordinates are utilized to access traffic information stored at the traffic information database.

In another aspect of the present invention, the image information and the traffic information associated with the positional coordinates are consolidated together by a consolidator that forms a consolidated, displayable visualization. The displayable visualization is a combination of the retrieved image and the retrieved traffic information.

In another aspect of the present invention, the electronic map device includes a user interface including a display element that is provided with the displayable visualization formed by the consolidator. The display element displays a three-dimensional-like image together with traffic information, thereby to provide a viewer of the display a visualization, easily understandable and identifiable that shows to the viewer the visualization of the traffic route together with traffic information therealong. A viewer need not exert undue attention to the displayed visualization as the visualization is created in a manner to facilitate near-immediate comprehension by the viewer of the visualization. In one implementation, the user interface includes an audio alert, or visual alert, further to alert a viewer of traffic or route anomalies.

In these and other aspects, therefore, apparatus, and an associated method, is provided for displaying a visualization of a traffic route. An image creator is configured to create images associated with the traffic route. A traffic indication obtainer is configured to obtain indications of traffic at least at a selected location along the traffic route. A consolidator is adapted to receive representations of the images created by the image creator and of the indication of the traffic obtained by the traffic indication obtainer. The consolidator is configured to consolidate together the representations of the images and the indication of the traffic to form a displayable visualization of the traffic route.

A more complete appreciation of the scope of the present invention and the manner in which it achieves the above-noted and other improvements can be obtained by reference to the following detailed description of presently-preferred embodiments taken in connection with the accompanying drawings, which are briefly summarized below, and by reference to the appended claims.

DETAILED DESCRIPTION

Figure 1:
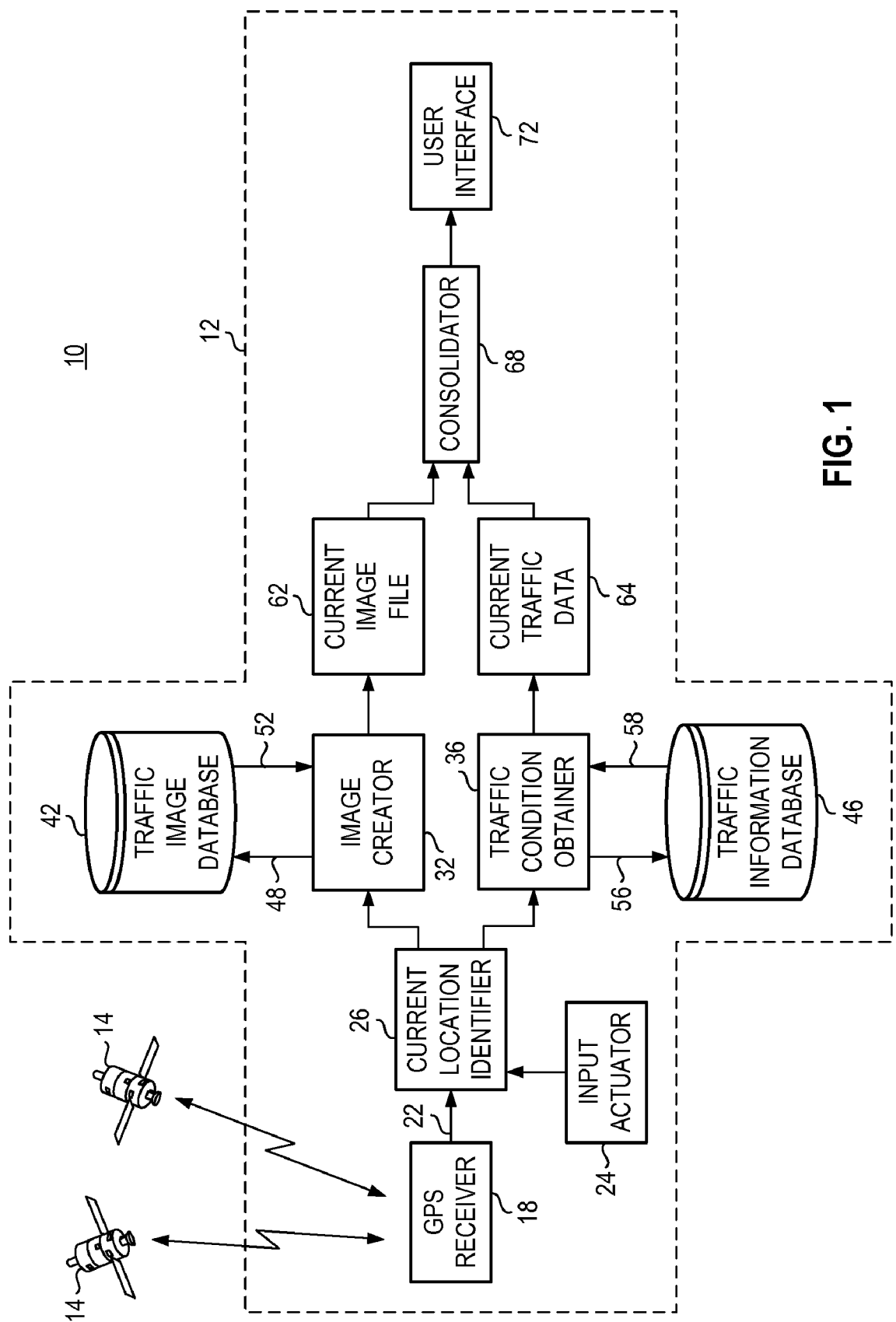
FIG. 1 illustrates a functional block diagram of an electronic map device that forms a traffic route visualization pursuant to an embodiment of the present invention.

Referring first to FIG. 1, an arrangement, shown generally at 10, shows an electronic map device 12 of an embodiment of the present invention. The electronic map device forms a traffic route visualization that facilitates easy and quick comprehension by a viewer thereof. The map device is formed of functional entities, implementable in any desired manner, including by algorithms executable by processing circuitry. The entities forming the map device in the exemplary implementation are commonly configured or positionable in communication connectivity, and provide for portability. In one implementation, the map device is vehicular, or operational-room-positioned, or is of dimensions permitting its hand carriage by a user.

The map device is provided with positional indicia. Here, the arrangement includes a set of global positioning system (GPS) satellites that broadcast GPS information, usable by a GPS receiver to identify with significant precision, the locational coordinates of the receiver. In this implementation, the map device includes a GPS receiver 18 that receives the broadcasts of the GPS satellites. And, the receiver determines positional coordinates of the receiver and, thereby, of the map device. Positional coordinates determined by the receiver are provided, here, by way of the lines 22, to a current location identifier 26. In other implementations, the positional coordinates are determined in other manners or simply provided manually to the map device, such as by way of an input actuator 24.

The location identifier 26 identifies a location of interest, corresponding to, or related to, the current location of the device. The location is based, e.g., upon the positional coordinates provided by the GPS receiver, input information provided by way of the input actuator, or determined in another manner. In one implementation, the positional coordinates provided by the GPS receiver identify the location of the device 12 and the input information provided by way of the input actuator identify a desired destination.

Location information identified by the location identifier is provided to an image creator 32 and to a traffic condition obtainer 36. The image creator operates to create an image associated, in a selected manner, with the location information provided by the location identifier. And, the traffic condition obtainer 36 operates to obtain traffic condition information associated, in a selected manner, with the location information identified by the location identifier.

In the exemplary implementation, a traffic image database 42 is connected to, or placed in communication connectivity with, the image creator 32. The database comprises a memory element or device capable of storing data forming images related to the location information provided by the location identifier. The data forming the images taken at locations at selected viewing angles or are photorealistic images. When positioned remote from other structure of the electronic map device, appropriate communication connectivity, such as by way of a radio link, is provided to permit access by the image creator. Analogously, the traffic indication obtainer is coupled to, or placeable in communication connectivity, with a traffic information database 46. The traffic information database is accessed to obtain information associated with traffic conditions associated with the location identified by the location identifier 26.

In one implementation, and as illustrated, information is retrieved from the traffic image database through the sending, indicated by the segment 48, of a request for the information and by return, indicated by the segment 52, of the requested information. And, analogously, the traffic information is retrieved from the database 46 by sending, indicated by the segment 56, a request for the information, and returning, indicated by the segment 58, the requested information to the obtainer 36. If the databases are connected by of radio links, appropriate radio transceiver circuitry (not separately shown) is further embodied with the electronic device.

The electronic map device further includes a current image file 62 that creates and maintains a file of images related to the location identified by the location identifier and retrieved by the image creator 32 from the traffic image database. And, the map device also includes a current traffic condition data 64, also related to the location identified by the location identifier and retrieved by the obtainer 36 from the traffic information database. The image file and current traffic condition data are provided to a consolidator 68. The consolidator consolidates the images contained in the current image file and the current traffic condition data to form a consolidation of the information that forms a displayable image displayable upon a user display of a user interface 72. The consolidated image that is displayable upon the user display of the user interface presents actual or virtual images of current road, or other, conditions along with relevant traffic data, e.g., traffic congestion conditions, road maintenance conditions, and accident information or other anomaly information to the user. In one implementation, the user interface further includes an audio or a visual alert mechanism that alerts a viewer of anomaly conditions. A viewer sees actual traffic conditions instead of a conventional, two-dimensional map together with traffic information and alerts related to the display.

Figure 2:
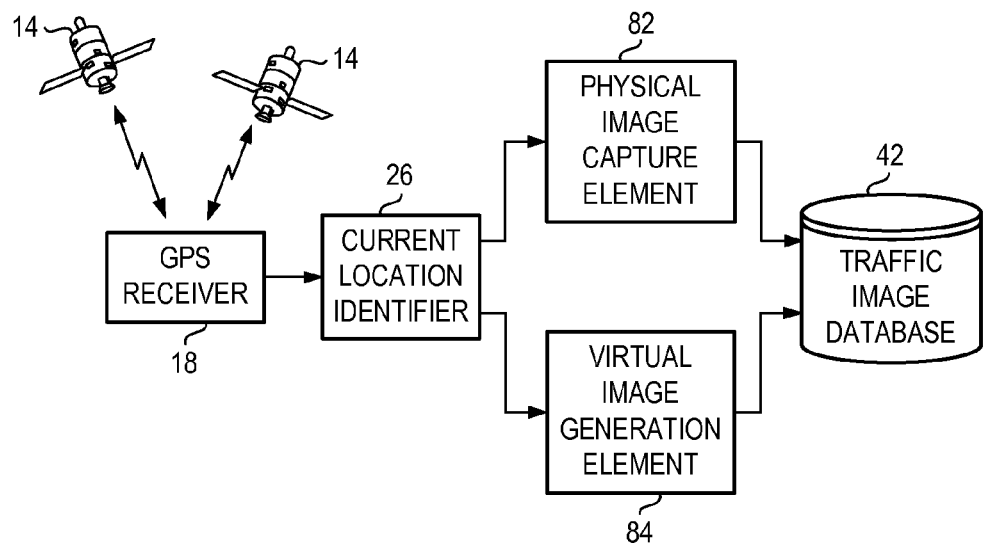
FIG. 2 illustrates a functional block diagram of further apparatus of an embodiment of the present invention.

Turning next to FIG. 2, portions of the arrangement 10 are again shown. Here, entities involved in the creation and storage of traffic images are represented. Again, and as shown previously, the GPS receiver 18 detects broadcasts of GPS information generated by the GPS satellites 14. And, responsive to reception of the GPS information, the GPS receiver generates positional coordinates that are provided to the location identifier 26. The location identifier identifies a location related to the positional coordinates, such as the location corresponding to the positional coordinates, or a location offset therefrom. As described previously with respect to FIG. 1, in one implementation, the location identifier identifies both the current location, indicated by the positional coordinates obtained by the GPS receiver and input information provided by way of an input actuator, such as a destination or other target location. The information pertaining to the identified location, or locations, is provided to a physical image capture element 82 and a virtual image generation element 84. In operation the elements 82 and 84 provide for the generation of the information stored at the traffic image data base 42. The operation of the elements of the arrangement shown in FIG. 2 are replicated in a large number of map devices, or other devices, operated at times other than the times at which the electronic map device is operated to provide a traffic visualization. That is to say, the plurality of map devices, or other devices that include the entities shown in the arrangement shown in FIG. 2 operate in a collaborative manner to obtain the image data that is populated in the image data base. The physical image capture element captures a physical image, such as a photographic image, associated with a location identified by the location identifier. The captured image, together with information of its location, is provided to the traffic image data base, and stored thereat. The image is indexed with its location to facilitate its subsequent retrieval. The collaborative nature of the collection of the physical images provides, over time, creation of an image data base of substantial data, i.e., images. In one implementation, orientations of the individual images captured by the physical image capture are also ascertained and associated with the images. Thereby the images stored at the data base also are indexed by their orientation. Upon subsequent retrieval of images, images of desired orientations are retrieved and used for purposes of traffic visualization. The virtual image generation element 84 provides for the generation of virtual images associated with the location identified by the location identifier 26 for purposes of image creation, the data which is stored at the traffic image data base 42. The virtual image generation element operates to create photorealistic three-dimensional models using virtual reality or computer-aided design tools. Here, again, the generated image is augmented with its location and orientation, identified by the location identifier. The virtual images created by the generation element 84 inherently contain three-dimensional traffic image data in their math models used by which to create the images. In which so ever manner that the images are created, through the collaborative generation by large numbers of devices, a rich, i.e., large, and current image collection is maintained at the data base 42.

Figure 3:
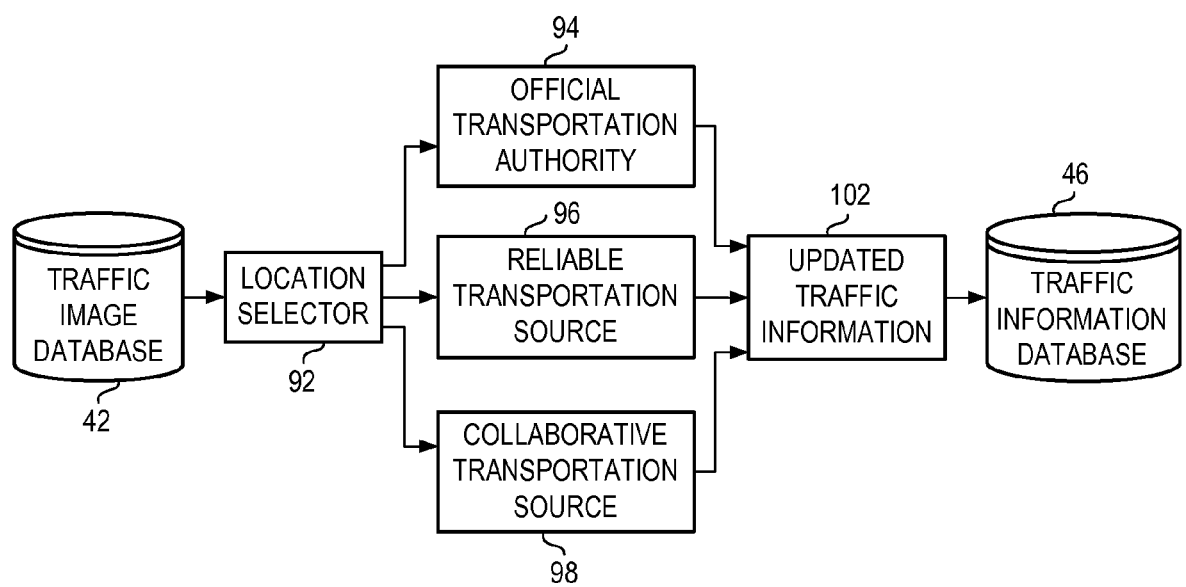
FIG. 3 illustrates a functional block diagram of further apparatus of an embodiment of the present invention.

FIG. 3 illustrates again the traffic image data base 42 and the traffic information data base 46 that form parts of the electronic map device 12, shown in FIG. 1. Here, again the representation shown in FIG. 3 is representative of the manner by which information is collected and stored in the respective data bases. Again, in the exemplary implementation, information is collected in a collaborative manner to store large amounts of data that is regularly updated, thereby to be current. The traffic information data base 46 also contains additional information related to the traffic associated with the traffic images created for, and stored at, the traffic image data base 42. Generally more so than the traffic images, the traffic information is dynamically changeable. And, hence, the traffic information stored at the data base 46 must regularly be updated. Updating occurs, for instance, on a minute-by-minute basis in high-traffic areas. Here, a location selector 92 provides a user with the capability to select a specific location captured in the traffic image data base 42. The location selector 92, in the exemplary implementation, forms part of the input actuator 24, implemented, for instance, as actuation of a selected key or keys of the input actuator.

Upon selection of the specific location, the user provides traffic information. Traffic information includes, for instance, identification of congestion conditions, traffic accidents, or other route anomalies. Here, the user is categorized amongst three types, an official transportation authority 94, a reliable transportation source 96, and a collaborative transportation source 98. The category of the official transportation authority 94 comprises, e.g., an official agency, including, for instance, a local police or government transportation agency that supplies traffic information based on available departmental or agency systems. The category of the reliable transportation source comprises, e.g., non-official organizations that are capable of disseminating traffic information, for instance, television and radio stations and other news organizations. And, the category of collaborative transportation sources 98 comprise, e.g., individuals that have access to current traffic information such as, for instance, drivers or other traffic observers. In which so ever category, the source of the traffic information is provided a mechanism to submit the relevant information. Access is provided, e.g., by way of the internet, direct data base access, wireless access, cell phone access, etc.

In a further implementation, the traffic information sources are identified with priorities or are otherwise rated. The prioritization or rating is used in the event that different sources report different traffic information. A higher-rated source is given a higher priority in the event that the traffic information conflicts, and the higher-priority information is used in the formation of the traffic visualization that is displayed upon the user display of the user interface (shown in FIG. 1). The representation shown in Figure also indicates that the traffic information sourced at any of the sources 94, 96, and 98 form updated traffic information, indicated by the block 102, that is provided to, and stored at the data base 46. Prioritization is performed by any entity, including the image creator 32, shown in FIG. 1, in the event of traffic information conflict. A higher priority is accorded, for instance, to an official source, such as an official transportation authority source. However, the higher priority, in one implantation, however, is offset if more-recent, non-official information is in conflict therewith. Priorities are changeable, and, in one implementation, are managed using a set heuristics and, alternately or additionally, an inference engine. In any event, the updated traffic information, indicated by the element 102, is obtained and stored at the data base 46.

Figure 4:
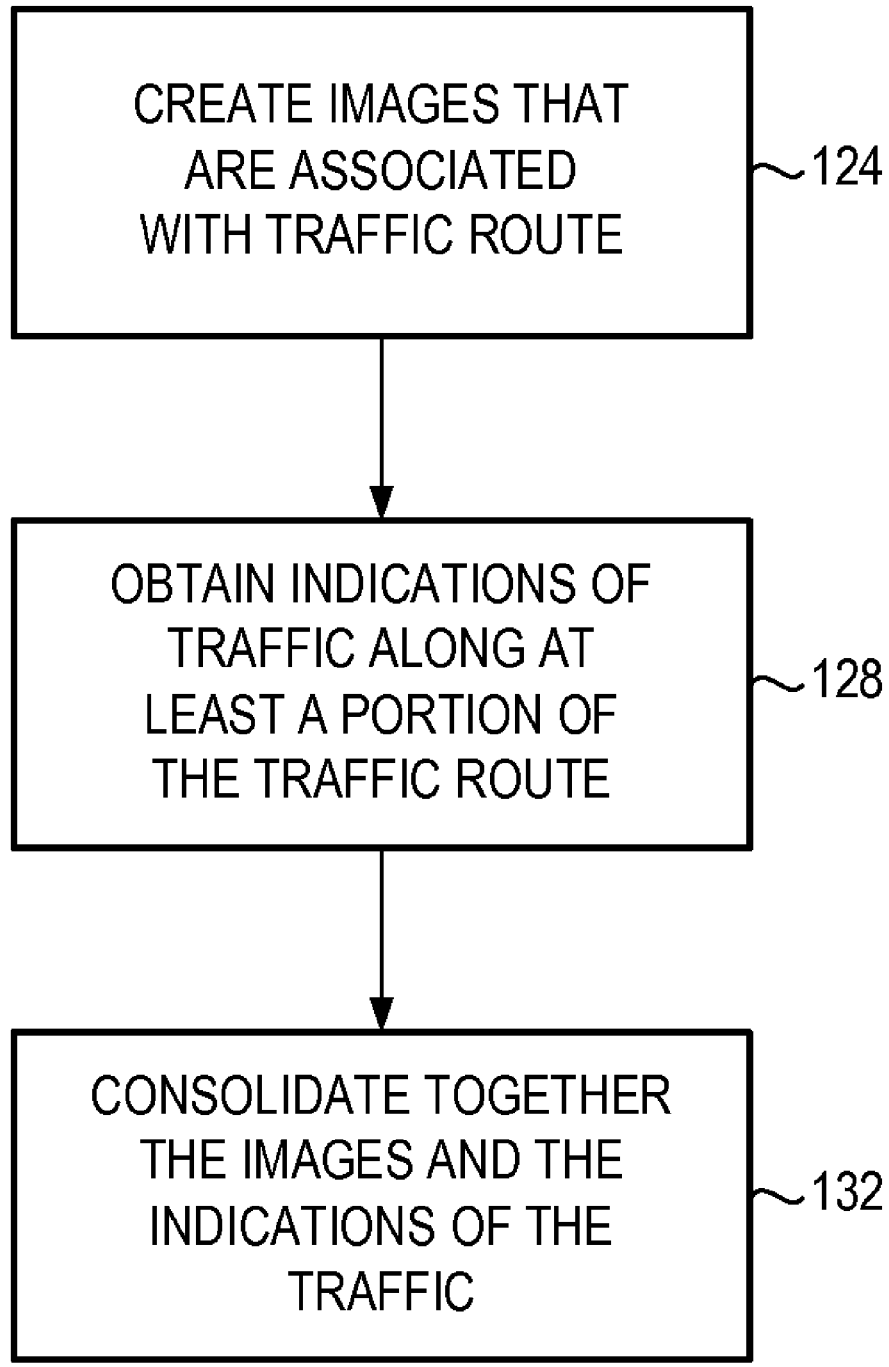
FIG. 4 illustrates a method flow diagram representative of the method of operation of an embodiment of the present invention.

FIG. 4 illustrates a method flow diagram, shown generally at 122, representative of the method of operation of an embodiment of the present invention. The method is for displaying a visualization of a traffic route.

First, and as indicated by the block 124, images are created that are associated with the traffic route. Then, and as indicated by the block 128, indications of traffic of at least a selected portion along the traffic route is obtained. Then, and as indicated by the block 132, the representations of the images and the indications of the traffic are consolidated together to form a displayable visualization of the traffic route.

Thereby, an improved traffic visualization is provided to a viewer of a map display, permitting the viewer readily to comprehend the visualization that contains traffic information as well as geographic information. Data base creation and maintenance is further provided by a collaborative effort. The contents of the collected data base information are accessible for the creation of the traffic visualizations.

Presently preferred embodiments of the invention and many of its improvements and advantages have been described with a degree of particularity. The description is of preferred examples of implementing the invention and the description of preferred examples is not necessarily intended to limit the scope of the invention. The scope of the invention is defined by the following claims.

What is claimed is:

1. Apparatus for displaying a visualization of a traffic route, said apparatus comprising:
    an image creator configured to create images associated with the traffic route;
    a traffic indication obtainer configured to obtain indications of traffic at least at a selected location along the traffic route; and
    a consolidator adapted to receive representations of the images created by said image creator and of the indication of the traffic obtained by said traffic indication obtainer, said consolidator configured to consolidate together the representations of the images and the indication of the traffic to form a displayable visualization of the traffic route;
    a traffic information database configured to store indications of traffic, wherein the indications of the traffic includes first-sourced information and second sourced information and wherein the traffic indication obtainer is further configured to prioritize the first-sourced and second-sourced information obtained from the traffic information database.

2. The apparatus of claim 1 further comprising a location identifier adapted to receive locational indications related to the traffic route and wherein the images created by said image creator are created, in part, responsive to the locational identifications.

3. The apparatus of claim 2 wherein the locational indications include indication of a location of the traffic route.

4. The apparatus of claim 2 wherein the locational indications include indication of a current location, offset from the traffic route.

5. The apparatus of claim 2 wherein the locational indications received by said location identifier comprise GPS, Global Positioning System, signal indications and wherein said location identifier determines a current location identification responsive to the GPS signal indications.

6. The apparatus of claim 2 wherein the indications of the traffic obtained by said traffic indication obtainer are obtained, in part responsive to the locational identifications.

7. The apparatus of claim 1 further comprising an image database configured to store images associated with traffic routes and wherein the images created by said image creator comprise images retrieved from said image database.

8. The apparatus of claim 7 wherein the images stored at said image database comprise actual video files.

9. The apparatus of claim 7 wherein the images stored at said image database comprise photorealistic digital images.

10. The apparatus of claim 1 wherein the indications of the data stored at said traffic information database comprise collaborative-sourced data.

11. The apparatus of claim 1 further comprising a display element configured to display the displayable image formed by said consolidator.

12. A method for displaying a visualization of a traffic route, said method comprising the operations of:
    creating images associated with the traffic route;
    obtaining, from a traffic information database, indications of traffic of at least a selected along the traffic route;
    consolidating together the representations of the images and the indications of the traffic to form a displayable visualization of the traffic route; and
    prioritizing first-sourced and second-sourced information obtained from the traffic information database.

13. The method of claim 12 wherein said operation of creating the images comprises retrieving images from an image database.

14. The method of claim 12 wherein said operation of obtaining the indications of the traffic comprises retrieving the indications of the traffic from a traffic information database.

15. The method of claim 12 further comprising the operation of identifying at least a first location of the traffic route, the location identified during said operation of identifying is used during said operation of creating the images.

16. The method of claim 15 wherein the location identified during said operation of identifying is used pursuant to said operation of obtaining the indications of the traffic.

17. The method of claim 12 further comprising the operation of displaying the displayable visualization.

18. Apparatus for facilitating visualization of traffic route data, said apparatus comprising:
    a traffic condition database configured to store collaborative-sourced data and organizationally-sourced data relating to a traffic route;
    a traffic indication obtainer adapted to access said traffic condition database, said traffic indication obtainer configured to resolve conflicting information, if any, between the collaborative-sourced and the organizationally-sourced data stored at said traffic condition database to utilize traffic-route information obtained from said traffic route database pursuant to visualization thereof.

* * * * *